United States Patent Office 2,706,644
Patented Apr. 19, 1955

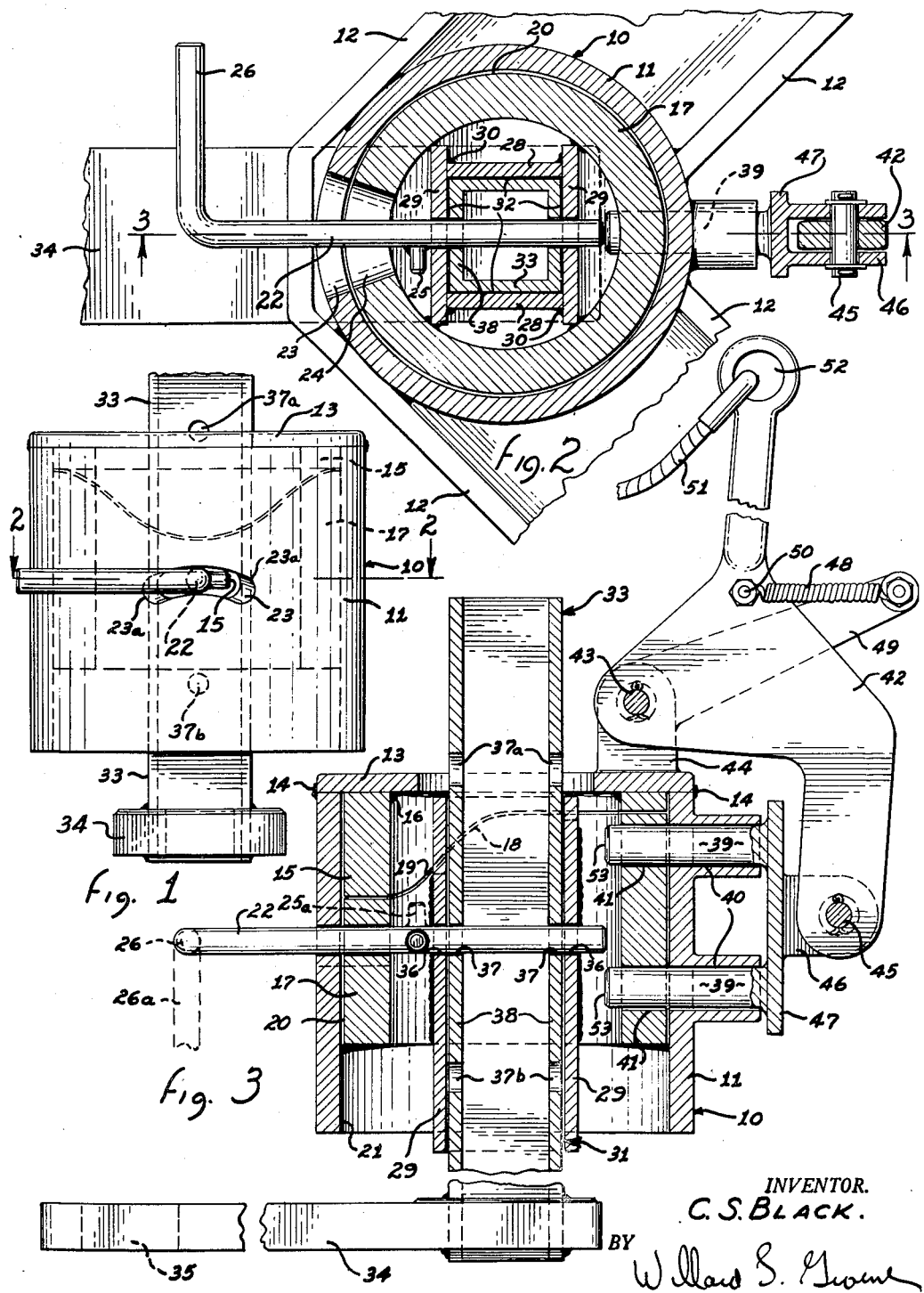

2,706,644

SELF-CENTERING TRAILER HITCH

Clarence S. Black, Phoenix, Ariz.

Application June 18, 1953, Serial No. 362,583

3 Claims. (Cl. 280—446)

This invention pertains to improvements in self-centering trailer hitches which are particularly adapted to the manipulation and operation of pickup trailers such as shown in my co-pending application, Serial No. 342,462, filed March 16, 1953, for Pickup Trailer.

One of the objects of the present invention is to provide a trailer hitch which permits a limited amount of sidewise pivotal movement for the trailer relative to the towing tractor.

Still another object of this invention is to provide an improved self-centering trailer hitch which may be locked out as a regular rigid pivotal trailer hitch but which may be released so as to provide limited sidewise shifting movement of the trailer relative to the towing vehicle to assist in its alignment in backing in to pick up a load or the like.

Still another object of this invention is to provide an improved self-centering trailer hitch which automatically returns to a locked out center position upon the normal forward movement of the trailer and towing vehicle.

Further features and advantages of this invention will appear from a detailed description of the drawings in which:

Fig. 1 is a front elevation showing a self-centering trailer hitch incorporating the features of this invention.

Fig. 2 is a section on the line 2—2 of Fig. 1.

Fig. 3 is a vertical section on the line 3—3 of Fig. 2.

As exemplary of one embodiment of this invention there is shown a self-centering trailer hitch having a body 10 comprising the vertically disposed cylindrical sleeve 11 which is rigidly attached to the frame 12 of the trailer vehicle to be towed. On top of the sleeve 11 is rigidly secured the cover plate 13 as by welding at 14. Also, fixed to the under side of the cover plate 13 is the upper centering cam 15 as by welding at 16.

A lower centering cam 17 has a mating centering cam surface at 18 which engages the cam surface 19 of the upper centering cam 15. The peripheral surface 20 of the member 17 is guided in the bore 21 of the sleeve 11 and is positioned therein by a height adjusting pin 22 which is inserted through an arcuate downwardly sloping slot 23 in the sleeve 11 and in a similar slot 24 in the lower centering cam 17. A stop pin 25 is integrally fixed to the height adjusted pin 22 and normally swings to upward position 25a, Fig. 3, as the outer end 26 of the height adjusting pin 22 is normally swung or drops to the position 26a, Fig. 3, so that the height adjusting pin 22 cannot work out through the slots 24 or 23 since the stop pin 25 prohibits such outward movement of the pin 22.

Fixed in the bore 27 of the lower centering cam 17 is the square tubular structure formed by the members 28 and 29 which are welded together at 30 so as to form a vertical square guide 31 having inside faces 32 in which nicely slides the guide stem 33 fixed integrally with the hitch arm 34 having the usual pivotal hole 35 in which a pintle may be connected to the towing tractor or vehicle. Bores are provided at 36 in the members 29 of the guide 31 and also bores 37 are provided in the sides 38 of the guide stem 33 through which may be passed the height adjusting pin 22. Additional bores are provided at 37a and 37b in the guide stem 33 so as to regulate the relative height of the hitch arm 34 with regard to the trailer frame 12 as desired. It is to be also noted that rocking movement of the hitch arm 34 effects rocking of the lower centering cam 17 relative to the upper cam 15.

The relative rocking motion of the lower centering cam 17 with regard to the upper centering cam 15 may be locked out or released by a pair of locking pins 39 which slide in radially disposed bores 40 in the sleeve 11 and are arranged to be inserted in or withdrawn from mating bores 41 in the lower centering cam 17 by a control lever 42 pivotally mounted on a pin 43 carried in a bracket 44 fixed to the cover plate 13 and having a depending arm pivotally connected by a pin 45 carried in a lug 46 attached to a cross head plate 47 integrally secured to the locking pins 39. Normally, the lever 42 is rocked in a clockwise direction, Fig. 3, around the pin 43 of engagement of the locking pins 49 in the bores 41 of the lower centering cam 17 by a tension spring 48 fixed to a support 49 formed integral with the bracket 44 and connected to the lever on a pin 50. Thus whenever the lever 42 is pulled in a counter clockwise direction, Fig. 3, by manipulation of a pull cord 51 secured in the eyelet 52 of the lever 42 the pins 39 may be released from engagement with the lower centering cam 17 so that the hitch arm 34 may have relative swinging movement within the limits provided by the ends 23a of the slot 23. Upon release of the lever 42, when the hitch arm 34 is in either sidewise position, the ends 53 of the locking pins 39 engage the peripheral surface 20 and ride thereagainst under the tension of the spring 48. As the tractor pulls the trailer forward, however, the cam surfaces 18 and 19 ride down against each other so as to normally bring the members in centered position and thereby line up the bores 41 with the locking pins 39 whereupon the pins 39 drop into the bores 41 and lock the upper centering cam 15 and lower centering cam 17 in their centered position automatically.

At any time during backing of the trailer and towing vehicle the operator may manipulate the pull cord 51 to permit the aforementioned sidewise relative pivotal motion of the trailer and towing vehicle to facilitate alignment of the trailer at a loading dock or in picking up a stationary load upon the ground such as involved in applicant's aforementioned co-pending application.

While the apparatus herein disclosed and described constitutes a preferred form of the invention, is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a self-centering trailer hitch, a body secured to a trailer to be towed, an upper centering cam fixed to said body, a hitch arm adapted to be connected to a towing vehicle, a lower centering cam connected to said hitch arm and having relative limited rotation relative to said upper centering cam, mating cam surfaces between said upper and lower centering cams to normally orient the relative rotation of said centering cams at an intermediate centered position of said limited rotation of said hitch arm and said body, a locking pin means between said body and said hitch arm to lock out relative rotation of said hitch arm and said body, said locking pin means comprising a pair of locking pins slidably mounted in said body, mating bores formed in said lower centering cam to receive said locking pins, and an operating lever pivotally mounted on said body connected to reciprocate said locking pins to and from said lower centering cam.

2. In a self-centering trailer hitch, a body secured to a trailer to be towed, an upper centering cam fixed to said body, a hitch arm adapted to be connected to a towing vehicle, a lower centering cam connected to said hitch arm and having relative limited rotation relative to said upper centering cam, mating cam surfaces between said upper and lower centering cams to normally orient the relative rotation of said centering cams at an intermediate centered position of said limited rotation of said hitch arm and said body, a locking pin means between said body and said hitch arm to lock out relative rotation of said hitch arm and said body, said locking pin means comprising a pair of locking pins slidably mounted in said body, mating bores formed in said lower centering cam to receive said locking pins, an operating lever pivotally mounted on said body connected to reciprocate said locking pins to and from said lower centering cam, and spring means for normally biasing said operating lever in a direction of engagement of said locking pins in said bores in said lower center cam.

3. In a self-centering trailer hitch, a body secured to a trailer to be towed, an upper centering cam fixed to said body, a hitch arm adapted to be connected to a towing vehicle, a lower centering cam connected to said hitch arm and having relative limited rotation relative to said upper centering cam, mating cam surfaces between said upper and lower centering cams to normally orient the relative rotation of said centering cams at an intermediate centered position of said limited rotation of said hitch arm and said body, a vertical guide fixed in said lower centering cam, a guide stem fixed to said hitch arm and slidably supported in said vertical guide, and a height adjusting pin supported for limited horizontal rocking movement in said body passing through said vertical guide and said guide stem to vertically secure said hitch arm at desired vertical positions relative to said body.

References Cited in the file of this patent
UNITED STATES PATENTS

| | | |
|---|---|---|
| 1,460,839 | Biggam | July 3, 1923 |
| 2,110,114 | Smith | Mar. 1, 1938 |
| 2,334,888 | Standlund | Nov. 23, 1943 |
| 2,447,659 | McDaniel | Aug. 24, 1948 |
| 2,647,761 | Kent | Aug. 4, 1953 |